United States Patent
Levy et al.

(10) Patent No.: US 6,560,535 B2
(45) Date of Patent: May 6, 2003

(54) GLOBAL POSITIONING SYSTEM ROADSIDE INTEGRATED PRECISION POSITIONING SYSTEM

(75) Inventors: Larry J. Levy, Columbia, MD (US); Thomas Thompson, Silver Spring, MD (US); David S. Hohman, Woodbine, MD (US); Thomas M. Murdock, Eldersburg, MD (US); Edwin E. Westerfield, Silver Spring, MD (US); Thomas M. Hattox, Silver Spring, MD (US); Thomas L. Kusterer, Elkridge, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/169,514

(22) PCT Filed: Jan. 5, 2001

(86) PCT No.: PCT/US01/00387

§ 371 (c)(1),
(2), (4) Date: Jul. 3, 2002

(87) PCT Pub. No.: WO01/50088

PCT Pub. Date: Jul. 12, 2001

(65) Prior Publication Data

US 2003/0055562 A1 Mar. 20, 2003

Related U.S. Application Data

(60) Provisional application No. 60/174,370, filed on Jan. 5, 2000.

(51) Int. Cl.[7] .............................................. G01C 21/26
(52) U.S. Cl. ...................... 701/213; 701/208; 701/214
(58) Field of Search ................................ 701/201–213, 701/214, 215; 342/357.01, 357.02, 357.12, 357.13; 340/990–995

(56) References Cited

U.S. PATENT DOCUMENTS 5,917,434 A * 6/1999 Murphy ...................... 701/207
5,928,309 A * 7/1999 Kerver et al. ............... 701/214

FOREIGN PATENT DOCUMENTS

WO    WO 98/05978    * 7/1997

* cited by examiner

*Primary Examiner*—Richard M. Camby
(74) *Attorney, Agent, or Firm*—Francis A. Cooch (57) ABSTRACT

A real-time integrated navigation system for a vehicle includes a GPS receiver, connected to a first antenna, where the GPS receiver receives GPS data from satellites and outputs GPS position data. The system also includes a communications link, connected to a second antenna and to the GPS receiver, receiving range and carrier phase measurements from at least one base station. The system further includes navigation aids which provide relative position data of said vehicle and a Kalman filter, connected to the output of the GPS receiver and the navigation aids, that integrates the GPS position data and the relative position data and outputs smoothed position data. The smoothed position data is used in transportation applications, especially detection of lane departure. This GPS-based positioning system is suitable for highway speeds during all weather conditions.

11 Claims, 6 Drawing Sheets

FIG. 6

GLOBAL POSITIONING SYSTEM ROADSIDE INTEGRATED PRECISION POSITIONING SYSTEM

This application claims the benefit of provisional application No. 60/174,370 filed Jan. 5, 2000.

BACKGROUND OF THE INVENTION

1. Field of the Invention

The present invention relates to the field of vehicle positioning systems that can be used to ascertain whether a vehicle is positioned within a lane on a roadway. More specifically, the present invention is directed to a vehicle positioning system that integrates global positioning system (GPS) data with other navigational data to determine in a real-time, robust and precise manner a lane position of the vehicle on a mapped roadway for lane departure detection.

2. Description of the Related Art

Many different on-road vehicle systems exist or are being developed to address individual applications such as lane-keeping, lateral collision avoidance, intersection collisions, route planning, traffic management, collision notification, automated control, etc. Each of these systems varies in performance and implementation challenges. Both commercial and government activities continue to address the problem of combining systems designed for specific applications to provide low cost, integrated vehicle systems which can significantly increase driver and vehicle safety. GPS has significant potential for enabling a variety of transportation user services.

Prior art systems have used a variety of methods to determine and maintain the position of a vehicle with precision. One type, through the use of optical systems, uses cameras and visualization techniques to follow lane boundaries. The benefits of such optical systems are that they have a relatively low cost, are based on existing technology and use existing lane markers. Optical systems have problems related to reliability due to paint differences, weather, exit lanes, etc. Other methods to determine and maintain the position of a vehicle with precision are magnetic sensor systems. In such a system, the vehicle follows magnets or magnetic pavement marking tape along lane boundaries. Such systems have a relatively low cost since they use low cost magnetic sensors and electronics and are largely not adversely impacted by weather. However, such systems require a great deal of infrastructure and upkeep, have reliability issues due to missing sensors and are impacted by the presence of large metallic objects in the area, as well as by trucks and buildings.

Other prior art systems used to determine and maintain the position of a vehicle with precision utilize driver based sensors. Such systems detect drowsiness from driver characteristics such as eye movement and/or wheel motion. Such systems have the benefit in that they can often identify the state of the driver prior to lane departure but are hampered by reliability problems due to operator differences and false alarms and do not benefit from an actual road position. RF systems are also used to detect lane position through the input of RF signals along lane/road boundaries. The RF systems are useful in all weather environments but require a great amount of infrastructure and upkeep required for the RF emitters along the road.

GPS and Differential GPS (DGPS) have also been used in prior art systems to determine and maintain the position of a vehicle with precision. In such prior art systems, the actual vehicle position is compared to surveyed lane boundaries through the use of GPS data. Such systems have the benefits of being useful in all weather, use existing lane markers and work with other systems that also use GPS data However, in prior art systems, the survey of the roadway is still needed and more importantly there are reliability issues due to signal blockage. Additionally, the application of DGPS using a low cost GPS receiver can result in position accuracy on the order of 1–5 meters. While such a level of accuracy is adequate for many applications, in lane-keeping approaches and other applications that require greater precision, systems that rely only on GPS or DGPS are not adequate to prevent imminent lane departure.

SUMMARY OF THE INVENTION

Accordingly, for the above reasons, the present invention is directed to a real-time, high-precision, DGPS-based, robust (due to the use of other navigation aids in addition to DGPS), automotive navigation system that can support a wide range of highway traffic applications. Specifically, the GPS based system is used to precisely monitor a vehicle's location, in real time, relative to road lane boundaries. The present invention is directed to a GPS Roadside Integrated Precision Positioning System (GRIPPS).

A first embodiment of the present invention is directed to a real-time integrated navigation system for a vehicle. The system includes a GPS receiver, connected to a first antenna and receiving GPS data from satellites and outputting GPS position data, and a communications link, connected to a second antenna and to the GPS receiver, receiving range and carrier phase measurements from at least one base station. The system also includes navigation aids which provide relative position data of said vehicle, and a Kalman filter, connected to the output of the GPS receiver and the navigation aids, that integrates the GPS position data and the relative position data and outputs smoothed position data In the system of the first embodiment the smoothed position data compensates for degradation, blockages or communication dropouts of the GPS data from the satellites. The navigation aids of the system can include at least one, and, preferably, at least two or more, of a distance measurement, e.g., odometer measurements or anti-lock braking system (ABS) wheel turns, heading measurements, and tilt measurements. Distance and heading measurements are preferred if only two navigation aids are used. More specifically, the navigation aids can include at least one, and, preferably, at least two or more, of anti-lock braking system wheel turns, electronic compass heading and pitch, and map vertical height that provides for the generation of a high rate, robust reference relative position. The real-time integrated navigation system for a vehicle provides smoothed position data that has a 2-cm position accuracy when GPS updates from good phase measurements are available.

In addition, the system of the first embodiment can include a lane departure module that receives the smoothed position data and utilizes stored map data to output a signal that is related to imminent lane departures of the vehicle. The system may have a spread spectrum radio modem as a part of its communications link and the second antenna can be a 900 MHz communications antenna to facilitate communications with the ground stations; other, better communications systems are commercially available.

A second embodiment of the present invention is directed to a method of providing real-time navigation data to a vehicle, having the steps of: receiving GPS data from satellites via a first antenna connected to a GPS receiver located on the vehicle and then receiving range and carrier phase measurements from at least one base station via a communications link connected to a second antenna and sending the range and carrier phase measurements to the GPS receiver. The method further includes the steps of outputting GPS position data from said GPS receiver to a Kalman filter and querying navigation aids to provide relative position data of said vehicle and providing the relative position data to said Kalman filter. GPS position data and the relative position data are integrated, using said Kalman filter, and the smoothed position data for the vehicle is output.

The method compensates for degradation, blockages or communication dropouts of the GPS data from the satellites. In addition, the queried navigation aids can include components providing at least one, and, preferably, at least two or more, of a distance measurement, e.g., odometer measurements or ABS wheel turns, heading measurements, and tilt measurements. Distance and heading measurements are preferred if only two navigation aids are used. More specifically, the components can provide at least one, and, preferably, at least two or more, of anti-lock braking system wheel turns, electronic compass heading and pitch, and map vertical height that provides for the generation of a high rate, robust reference relative position.

The method may also include providing the smoothed position data to a lane departure module and computing imminent lane departures of the vehicle based on stored map data and the smoothed position data. Preferably, the smoothed position data has a 2-cm position accuracy.

The method is also applicable where the communications link receives range corrections via a spread spectrum radio modem and the second antenna is a 900 MHz communications antenna.

BRIEF DESCRIPTION OF THE DRAWINGS

The features of the disclosed method and system will become more readily apparent and may be better understood by referring to the following detailed description of illustrative embodiments of the present invention, taken in conjunction with the accompanying drawings. FIGS. 1 to 6 show embodiments of the present invention, wherein

DESCRIPTION OF THE PREFERRED EMBODIMENTS

Embodiments of the present invention will now be described with reference to FIGS. 1 to 6.

Standard commercial products for GPS support civilian Coarse/Acquisition (C/A) code GPS which provides position accuracy on the order of 30–50 meter Circular Error Probability (CAP), due primarily to Selective Availability (SA). The application of Differential GPS (DGPS) using a low cost GPS receiver can result in position accuracy on the order of 1–5 meters. DGPS involves the broadcasting of navigation data and measurements or corrections from a surveyed base station. This approach can mitigate the effect of common error sources.

Current efforts exist to provide an infrastructure (i.e. WAAS, WADGPS, US Coast Guard, Minnesota DOT, etc.) for the transmission of differential GPS corrections. In order to get high position accuracy (2–19 cm), a system based on good signal phase measurements and cycle ambiguity resolution is required to achieve positioning accuracy of a few centimeters. Furthermore, additional navigation data at a higher update rate must be provided; separation between surveyed ground stations must be minimized; and the GPS receiver would require the capability to minimize multipath and noise. However, in a dynamic environment, consistency of high accuracy GPS is dependent on many factors including: receiver quality, distance from base station, reliability of the communications RF link, satellite geometry, blockage of GPS signals, RF and GPS antenna placement/multipath, etc.

The potential ability to support multiple transportation applications, while taking advantage of existing infrastructure, makes precise vehicle positioning using GPS an important technology area to pursue. As noted above, however, prior art systems have been unable to take advantage of these benefits.

A wide range of transportation applications can be supported with a single, configurable on-board vehicle system. Some of the applications, such as route planning, collision notification, and traffic management require easily achieved position accuracies on the order of 10–30 meters. However, applications such as lane-keeping, collision avoidance, impaired driving detection, and automated vehicle control require real-time precise positioning and a precision reference map. For example, the lane-keeping application requires accuracy on the order of a few centimeters to identify imminent lane departures early enough such that the operator can take preventative measures. If multiple vehicles applied a precision positioning system with two-way communications, their positions could be broadcast to other vehicles in the immediate vicinity. These positions could be tracked by software on-board the vehicles to support warning the operators of potential collisions.

Monitoring accurate vehicle positions over time and comparing to nominal driver behavior could provide a measure of driver effectiveness (i.e. identify a drowsy or impaired driver). For real-time vehicle control, the precise position information could be used with surveyed map data and vehicle control actuators to support navigation and, hence, control of the vehicle. Even though the same accuracy is not required, the position information and two-way communications could be used to support route planning, collision notification and traffic management as well.

A properly designed, in-vehicle, GPS-based system can support all functions at a high level of accuracy and provide a robust, all weather alternative to other sensor systems being considered (magnetic, vision-based, radio frequency (RF) transponders). An integrated GPS system appears to offer the capability to support systems envisioned for "intelligent" vehicles of the future, —private automobiles, commercial and transit vehicles.

The development activities associated with the present invention concentrated on the real-time system instrumentation and software for an Instrumented Vehicle (IV). These activities can be broken up into system architecture, system development, Kalman filter, and software methodology.

Figure 1:
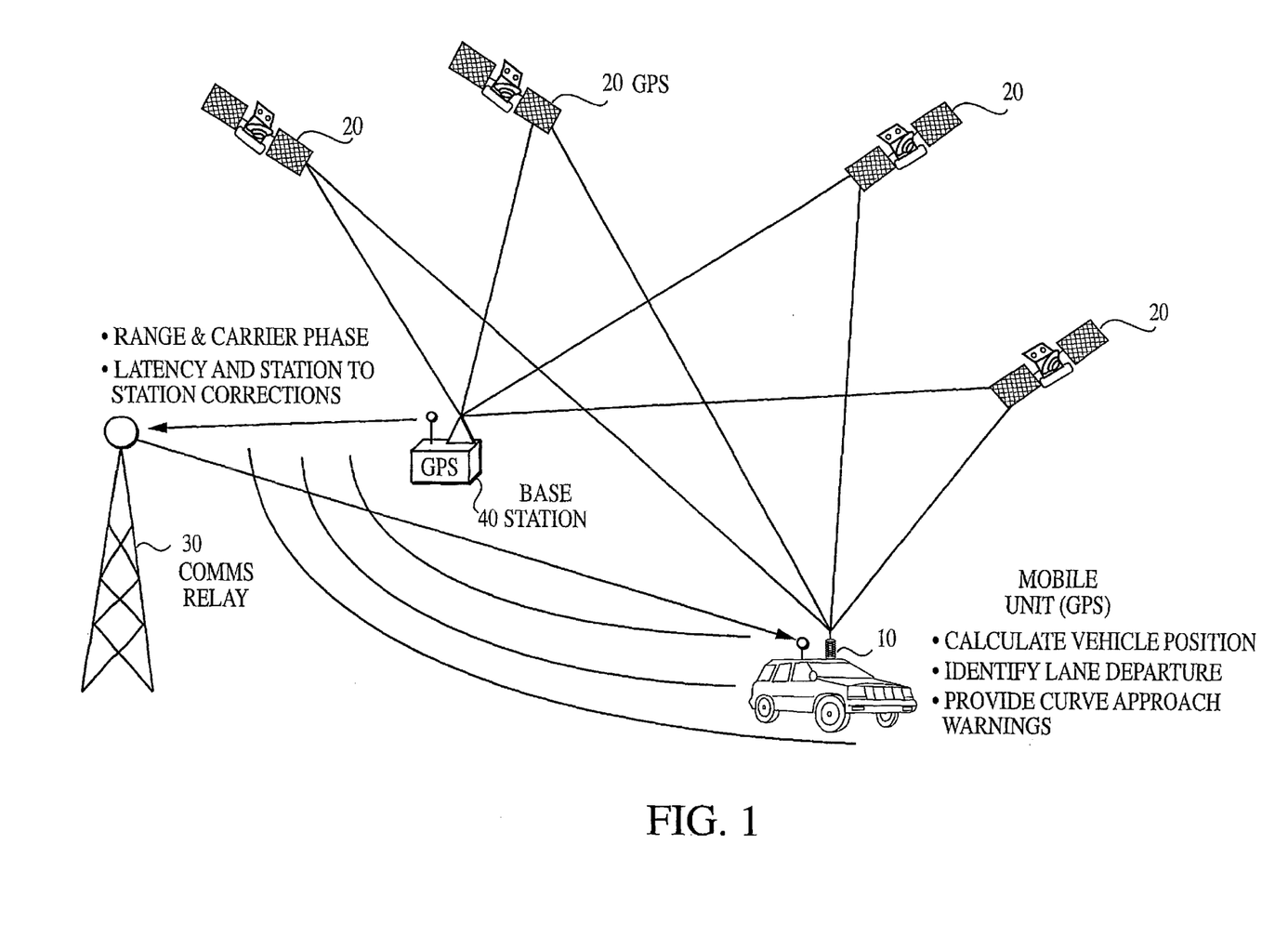
FIG. 1 illustrates the overall configuration of the GPS Roadside Integrated Precision Positioning System (GRIPPS)
Figure 2:
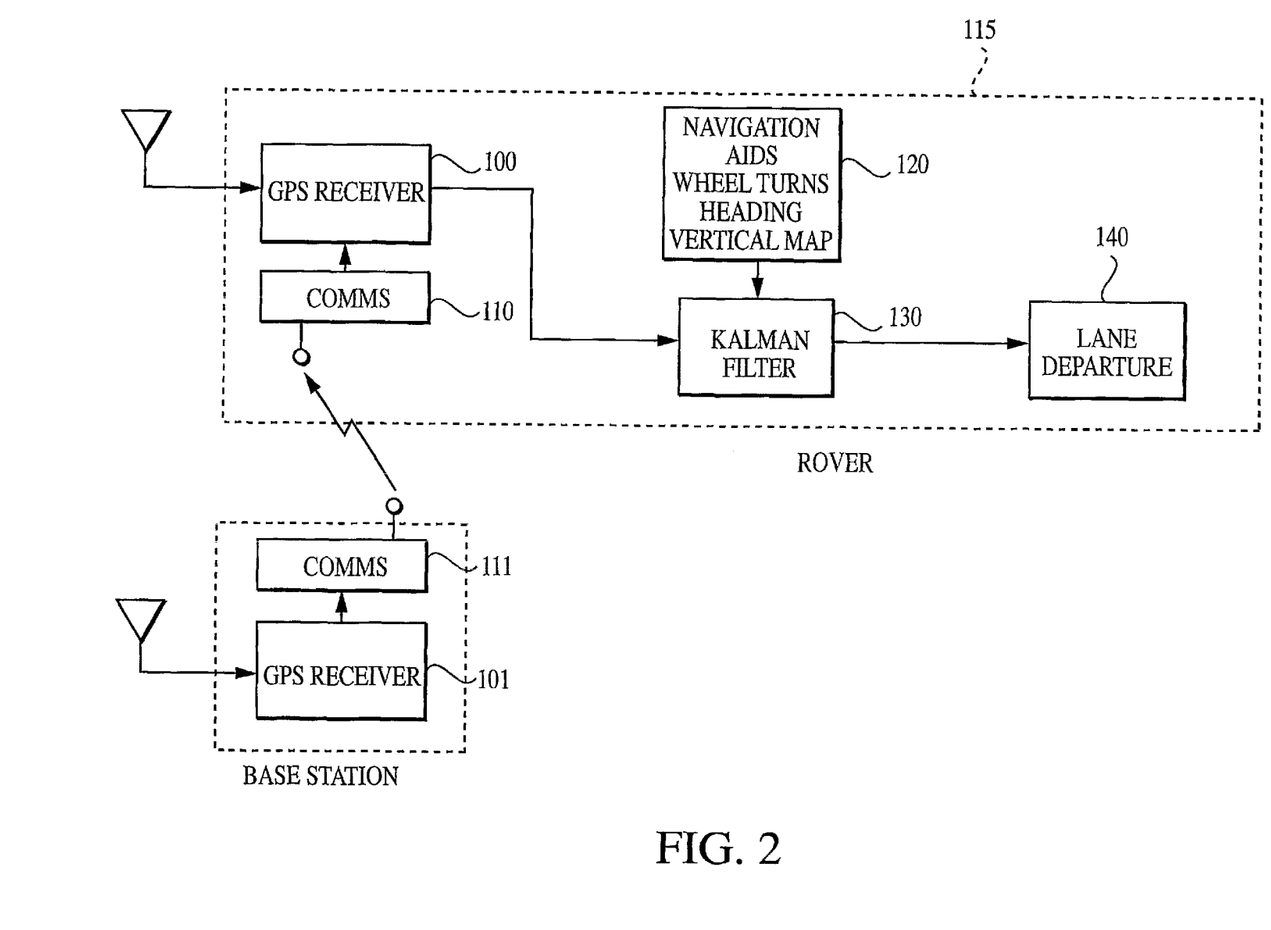
FIG. 2 illustrates an integrated system architecture for GRIPPS.

The general architecture of the present invention is illustrated in FIG. 1. The IV is illustrated as a mobile unit 10, which contains a GPS unit and other processing portions of the system. The IV receives signals from GPS satellites 20 and communication relays 30 along the roadway. The signals sent to the communications relays are coordinated by base stations 40 that are also in communication with the GPS satellites 20. Through the system, the position of the vehicle can be determined with a high degree or accuracy and departures from the lane of the roadway upon which the vehicle is traveling can be determined A specific embodiment of the present invention as it relates to determination of lane departure is illustrated generally in FIG. 2. The IV is illustrated as a ROVER portion 115. The IV has a GPS receiver 100 and communication module 110 that provides data to the GPS receiver 100. The communications module receives data from a base station that also has a GPS receiver 101 and a communication module 111. The output of the GPS receiver 100 in the IV is sent to the Kalman filter 130. The filter integrates data from other navigation aids 120 to determine an output that signals whether a lane departure has been determined by the lane departure module 140.

Figure 3:
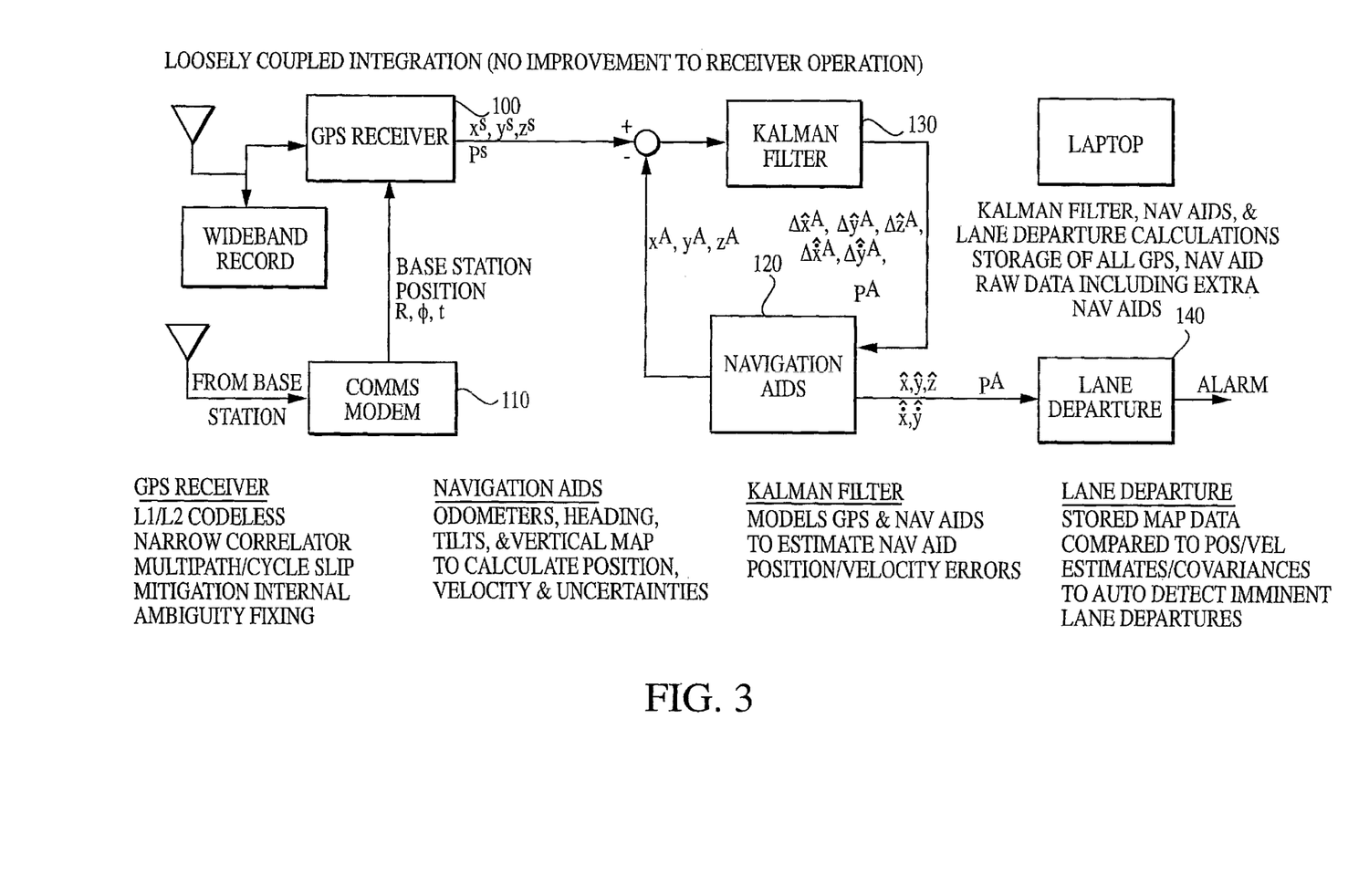
FIG. 3 illustrates a schematic showing the integration of data to determine lane departure of a vehicle.

An integrated system architecture, using DGPS 100 and navigation aids 120 to calculate real-time vehicle position, is illustrated in FIG. 3. The real-time data collection system was developed on the IV to acquire DGPS, odometer, heading, tilts, inertial navigation measurement, gyroscope, and video camera data. FIG. 3 also shows the outputs of the different portions of the system, that will be discussed in greater detail below.

The architecture developed for the system of the present example of the invention is based on convenience and utilization of existing hardware. A DGPS-based system was chosen over Optical, Magnetic, and RF systems for reasons mentioned in the previous section. First, the performance of several commercial GPS receivers were evaluated for ability to provide 2-cm accuracy. Examination of commercial GPS receiver performance showed that there are several receiver systems that offer differential position accuracy to a few centimeters. The GPS-based inertial navigation system of the present invention was designed around a DGPS system developed by ASHTECH, but other off-the-shelf DGPS systems can also be used.

In terms of communications options, for communicating between the vehicle and the base stations, options such as VHF/UHF radio, FM-subcarrier, cellular phone, Cellular switched-circuit data, Iridium, and Location and Monitoring Service (LMS) are all applicable to the present invention. The LMS communication link was selected in the preferred embodiment, despite the fact that cellular phone and VHF/UHF communications are proven technologies and are capable of transmitting data at greater distances. The reference stations used transmit L1 and L2 code and carrier phase data at a 2 Hz update rate to the mobile unit through a LMS 900 MHz RF antenna and communication modem. The Instrumented Vehicle (IV) was outfitted with two computers, inertial and vehicle sensors, and a differential GPS system.

In a preferred embodiment, the GPS system includes a GPS receiver, a choke ring antenna, a spread spectrum radio modem, and a 900 MHz antenna In the preferred embodiment, an ASHTECH Z-12 GPS receiver served as the GPS receiver. The present invention finds utility with small, high-quality GPS antennas, which are generally available; however, choke ring antennas provide improved multipath mitigation, in the preferred embodiment.

The moving receiver uses navigation data and measurement data from the base station through the RF communications link, and data corrections for applicable satellites are computed by the receiver to accurately determine the vehicle position. High precision positioning is accomplished because the receiver employs sophisticated processing (which can include L1/L2 codeless, narrow correlators, multipath/cycle slip mitigation, internal ambiguity fixing and differential carrier phase ranging techniques). Based on theoretical performance analysis, the highest accuracy is achieved when base to mobile separation is within a few kilometers.

Figure 4:
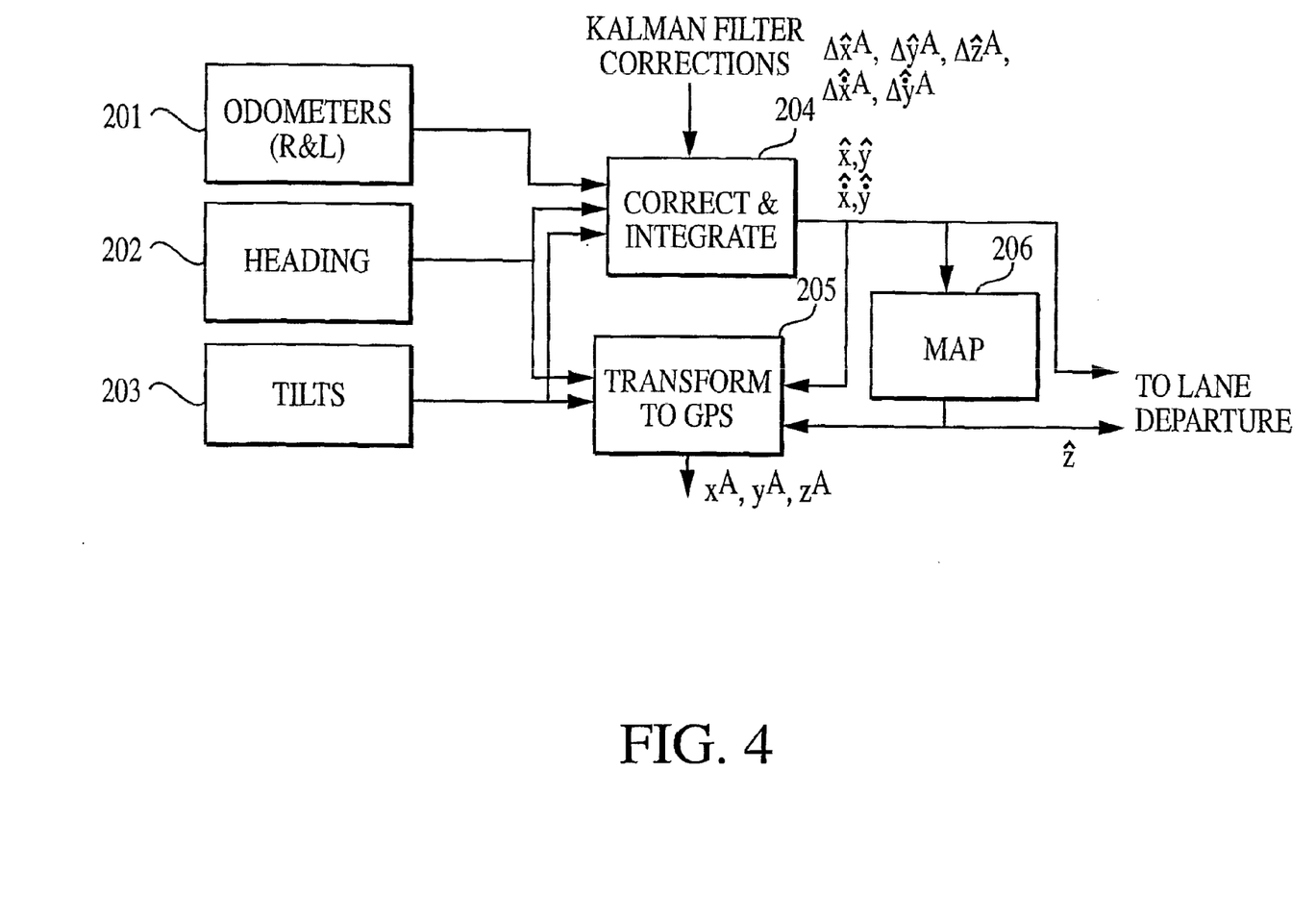
FIG. 4 illustrates a schematic representation of navigational aids used in the system.

In this implementation, the system directly applies the position information as provided by the receiver. As shown in FIG. 4, GPS position and velocity data, select navigation aids (odometers 201, vehicle heading 202, and vehicle tilts 203) and vertical map measurements (from the surveyed reference map 206) were integrated 204 using an Extended Kalman filter to smooth through GPS signal dropouts. This serves to enable vehicle navigation during GPS blockage with graceful performance degradation. Data from the navigation aids were analyzed to determine the optical configuration of sensors to smooth through data dropouts.

In testing, data was collected to evaluate several GPS hardware configurations to determine an initial system approach that would increase reliability of the position data. A video camera was also used to view the lane markings in order to provide an independent observation of the lane departures and to assist in mapping the road boundaries. A user interface for lane departure and warning capability was developed.

The data acquisition hardware will now be addressed. The Instrumented Vehicle (IV) data acquisition system is built around a processor equipped with several ports used to acquire serial and analog sensor outputs. This system is also equipped with a network interface to the Kalman Filter Processing System, which is run, preferably, on a separate processor. This processor accepts analog signals from the inertial measurement unit and a pulse train representing wheel turns from the Anti-Lock Braking System (ABS).

The Kalman filter utilizes software to process incoming signals. Upon receiving data, the Kalman filter software implements the filter on the real-time data and subsequently returns data indicating lane deviation, filter process status and whether the IV is in the reference map location.

An equipment stack contains navigation aids and the ABS interface. The wheel turns are sensed from the ABS, while heading and pitch data are measured from an electronic compass sensor module. The navigation aids also include an Inertial Measurement Unit, which provides linear accelerations and angular rates, and a fiber optic gyroscope.

Figure 5:
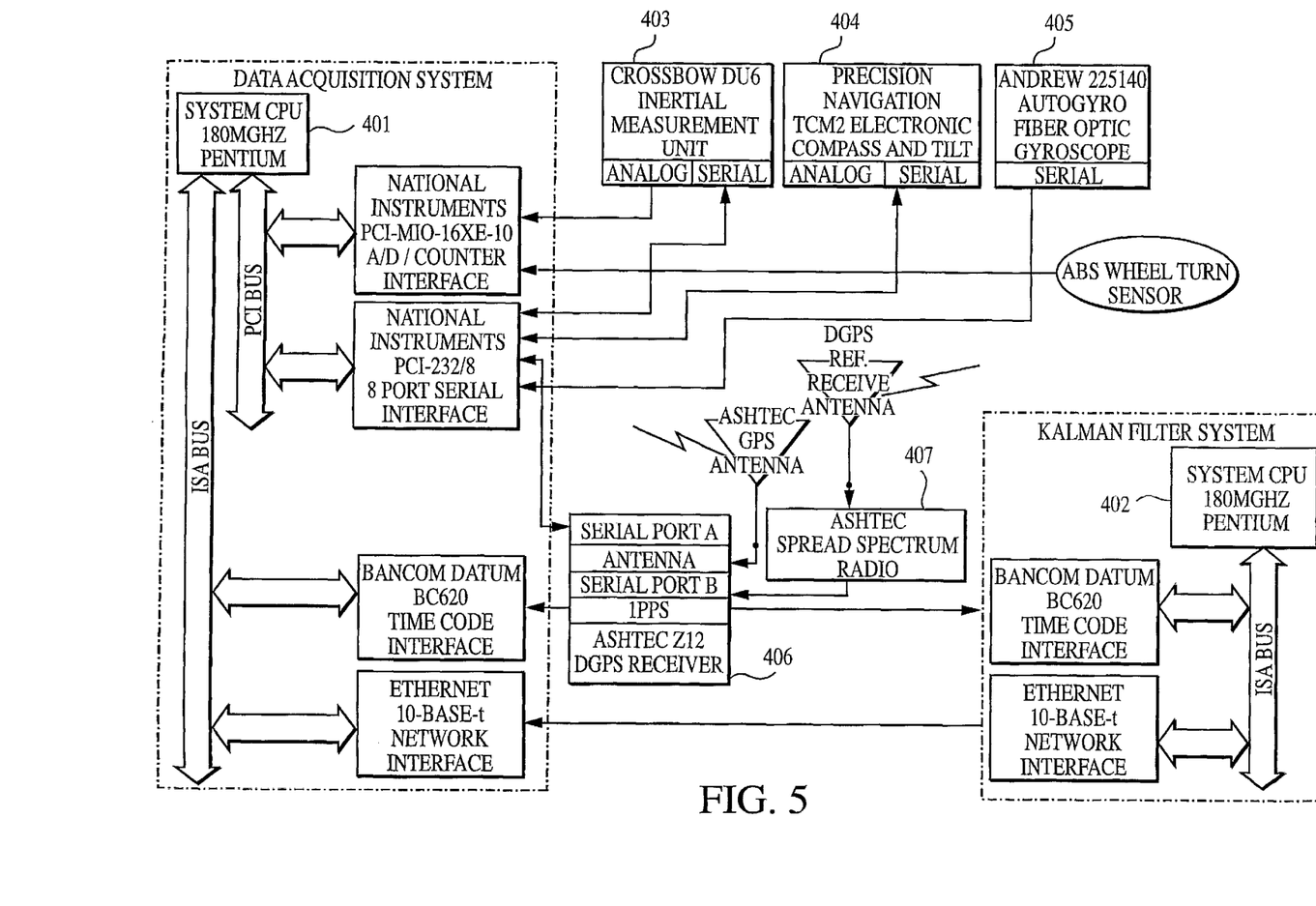
FIG. 5 illustrates a schematic representation of a specific embodiment of the system of the present invention.

In an exemplary embodiment, illustrated in FIG. 5, the GPS based inertial navigation system instrumentation installed in the Instrumented Vehicle is made up of the following:

Data Acquisition System Computer (PENTIUM 180 MHz computer), 401;

Kalman Filter Processor/Real Time video Computer (PENTIUM 180 MHz computer), 402;

CROSSBOW DU6 Inertial Measurement Unit, 403;

PRECISION NAVIGATION TCM2 Electronic Compass with tilt, 404;

ANDREW 225140 AUTOGYRO Fiber Optic Gyroscope, 405;

ASHTECH Z-12 DGPS Receiver, 406; and

ASHTECH Spread Spectrum Radio Modem, 407.

The exemplary embodiment also includes interface modules that allow communication between the constituent parts. While the above constituent parts of the system have been used in a particular embodiment, the present invention is not so limited. The range of applicable components of the real-time integrate navigation system are discussed above.

The Kalman filter software will now be discussed. An eight-state Extended Kalman filter (E-KF) with GPS and navigation aids is used to estimate the vehicle position/velocity errors. An estimate and covariance propagation is performed every update time. A measurement update occurs when there is either GPS, height, or both measurements available. The state vector is:

$$\delta x = \begin{bmatrix} \delta N \\ \delta E \\ \delta D \\ \delta SFW \\ \delta \psi \\ \delta \theta \\ \delta SF\theta \\ \delta H \end{bmatrix} \begin{cases} \text{North vehicle position error (m)} \\ \text{East vehicle position error (m)} \\ \text{Down vehicle position error (m)} \\ \text{Wheel turn scale factor error (unitless)} \\ \text{Azimuth error (deg)} \\ \text{Pitch error (deg)} \\ \text{Pitch scale factor error (unitless)} \\ \text{Height error (m)} \end{cases} \quad (1)$$

where the vehicle position is in the North-East Down (NED) local frame defined by the reference (base station) position.

After each measurement update, the E-KF accumulates whole value estimates for position (r), navigation ($\alpha$), and velocity (v) by the following equations:

$$\hat{r}_{i+} = \hat{r}_{i-} + \delta \hat{r}_{i+}, \hat{\alpha}_{i+} = \hat{\alpha}_{i-} + \delta \hat{\alpha}_{i+}, v_{i+} = v_i + \delta \hat{r}_{i+}/\Delta t, \delta \hat{x} = 0, \quad (2)$$

where $\delta r$ are the first three elements, and $\delta \alpha$ are the last five elements of the state vector, $\delta x$. The transitions are defined by $$\begin{bmatrix} \delta \dot{r} \\ \delta \dot{\alpha} \end{bmatrix} = F * \begin{bmatrix} \delta r \\ \delta \alpha \end{bmatrix}, \quad \text{where } F = \begin{bmatrix} 0 & \bar{F}_{r\alpha} \\ 0 & 0 \end{bmatrix} \quad (3)$$

The transition matrix in the filter is approximated by:

$$\Phi_{i,j-1} = I + F*\Delta t + \tfrac{1}{2}*F^{2}*\Delta t^2 \quad (4)$$

where $$\bar{F}_{r\alpha} = [\dot{d}_1 * B_1 | -[\bar{V}_x]*A_3 | -[\bar{V}_x]*A_2 | -\bar{\theta}*[\bar{V}_x]*A_2 | 0], \; T_1 = (-\bar{\psi})_3, \; T_2 = (-\bar{\theta})_2, \; T_{NB2} = [T_1 * T_2] \quad (5)$$

($A_j$, $B_j$) are the columns of ($T_1$, $T_{NB2}$) and $\dot{d}_1$ is defined later in this section. Note that $A_2 = B_2$ and $A_3 = [0, 0, 1]^T$. The diagonal process noise matrix, which is based on judgement and testing, is $Q = [q_k^2]$, where the nominal $q_k = [0.5, 0.5, 0.4, 10^{-4}, 0.5, 0.1, 0.0, 0.001]$. The diagonal prior uncertainty matrix is $P_0 = [p_k^2]$, where $p_k = [10^{+4}, 10^{+4}, 10^{+4}, 0.04, 20, 3, 10^{-4}, 0.1]$.

The measurements are:

$$y^* = \begin{bmatrix} \text{North GPS position} \\ \text{East GPS position} \\ \text{Down GPS position} \\ \text{Height map} \end{bmatrix}, \quad \text{and } \delta y = \begin{bmatrix} r_{GPS}^{NED} - r_{i-}^{NED} \\ -\delta d_{i-} \end{bmatrix} \quad (6)$$

where $\delta d$ is the vehicle down position with respect to the map. The sensitivity matrix is $$H = \begin{bmatrix} 1 & 0 & 0 & | & 0 & 0 & 0 & 0 & 0 \\ 0 & 1 & 0 & | & 0 & 0 & 0 & 0 & 0 \\ 0 & 0 & 1 & | & 0 & 0 & 0 & 0 & 0 \\ 0 & 0 & 1 & | & 0 & 0 & 0 & 0 & -1 \end{bmatrix} \quad (7)$$

The noise matrix is $$R = \begin{bmatrix} [P_{GPS}] & 0 \\ 0 & (0.03)^2 \end{bmatrix}. \quad (8)$$

where $P_{GPS}$ is the position covariance from GPS or an override of $P_{GPS} = 10^{+4} * I_3$ is used A survey approach and map representation were developed to provide both a height measurement and a lane departure and warning capability. The map is constructed to give the location of the GPS antenna when the passenger side, right wheel is on the right lane marker. The map frame is Along Track (a), Cross Track (c), and Down (d). The map is parameterized verses Along Track. The map frame has origin at $R_0$ (meters), and is rotated with respect to NED frame by azimuth from North in degrees ($\theta$). To make the map, the GPS position points are put into the map frame. A cubic spline interpolation is used to get a map at uniform spacing for Along Path. The spline derivative, dc/da, is used to calculate $\phi(a)$, local line direction in the map frame. The map is in column format of a, c, d, $\phi$, with a being uniformly spaced (nominally 2 meters). Because spline interpolation is used to produce the map on a defined grid, multiple vehicle tracks can be combined (averaged) to make a merged map.

To evaluate the vehicle position with respect to the map, the fixed NED to map transformation matrix, $T_{MN} = (\theta)_3$, must be computed. This transformation matrix is based on a single rotation about the z-axis. The vehicle position is calculated in the map frame by $$\begin{pmatrix} a \\ c \\ d \end{pmatrix} = r^{Map} = T_{MN}(r^{NED} - R_0) \quad (9)$$

where $r^{NED}$ is the estimated position in the NED frame.

The map is interpolated using a spline to generate the values $\bar{c}$ (a), $\bar{d}$ (a), and $\bar{\phi}$ (a). The vehicle position with respect to the map or right hand lane marker (delta lane, $\delta l$, and delta down, $\delta d$) is evaluated by $$\delta c = c - \bar{c}(a) \delta l = \delta c * \cos(\bar{\phi}(a)) \; \delta d = d - \bar{d}(a) \quad (10)$$

The delta lane measurement is the only desired output of the real time system.

Wheel turns from ABS with azimuth and pitch from the electronic compass are integrated to obtain the new navigated position, $\delta \hat{r}_{i-}$. Integration, and filter propagation and navigation aid updates occur whether there is a real-time DGPS measurement present or not. The distance traveled over the period of the update is computed by summing the incremental distances formed by products of wheel circumference (k), accumulated wheel scale factor estimate (1+$\hat{\alpha}$ (1)) and delta wheel counts ($\Delta$WC). The wheel circumference is measured and variations due to temperature and pressure are accounted for.

The navigated position integration is performed using the following equations:

$$d_{j,j-1} = k*(1+\hat{a}(1))*\Delta WC_{j,j-1} \quad (11)$$

$$\overline{\psi}_j = \frac{1}{2}*(\psi_{j-1}+\psi_j)+\psi_B+\psi_C+\hat{a}(2)$$

$$\overline{\theta}_j = \frac{1}{2}*(1+\hat{a}(4))*(\theta_{j-1}+\theta_j)+\theta_B+\hat{a}(3)$$

$$\Delta r_{j,j-1} = d_{j,j-1} * \begin{bmatrix} \cos\overline{\theta}_j * \cos\overline{\psi}_j \\ \cos\overline{\theta}_j * \sin\overline{\psi}_j \\ -\sin\overline{\theta}_j \end{bmatrix}$$

$$r_j = r_{j-1} + \Delta r_{j,j-1}$$

Figure 6:
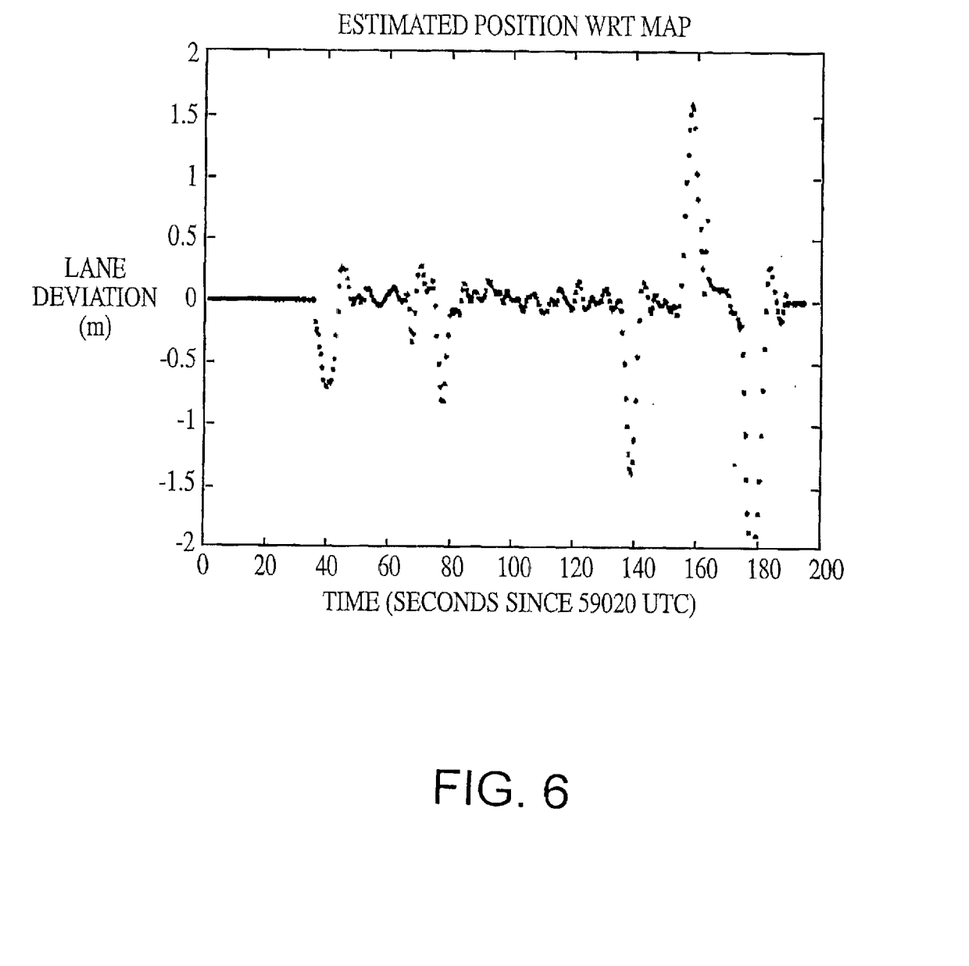
FIG. 6 illustrates experimental results of lane deviations of a vehicle as determined by the system of the present invention.

Then the following are computed at each update interval from the loop quantities above:

$$\dot{d}_i = \sum_{j=1}^{m=5}(d_{j,j-1})/dt \quad (12)$$

$$\hat{r}_{i-} = \hat{r}_{(i-1)+}\sum_{j=1}^{m=5}\Delta r_{j,j-1}$$

$$\overline{v}_i = (\hat{r}_{i-} - \hat{r}_{(i-1)+})/dt$$

$$\overline{\psi} = \sum_{j=0}^{m=5}\psi_j/(m+1)$$

$$\overline{\theta} = \sum_{j=0}^{m=5}\theta_j/(m+1),$$

where ψ=compass (magnetic) heading
θ=pitch (positive nose up)
WC=wheel counts or turns (fractional)
$\psi_B$=prior heading bias ("magnetic true", sensor mounting and sensor bias)
$\psi_C(\psi)$=calibration foe vehicle magnetic properties (deviation)
$\theta_B$=prior pitch bias (sensor mounting and sensor bias)
k=wheel circumference Experimental results for the system of the present invention are shown in FIG. 6. The graph shows the output of the Kalman filter processor and lane deviations from the map during the drive. The test run also involved intentional lane departures, shown after 120 seconds on the graph.

Although the embodiments of the present invention have been described in detail, it will be understood that the present invention is not limited to the above-described embodiments, and various modifications in design may be made without departing from the spirit and scope of the invention defined in claims.

What is claimed is:

1. A real-time integrated navigation system for a vehicle, comprising:
    a GPS receiver, connected to a first antenna and receiving GPS data from satellites and outputting GPS position data;
    a communications link, connected to a second antenna and to said GPS receiver, receiving range and carrier phase measurements from at least one base station;
    navigation aids which provide relative position data of said vehicle;
    a Kalman filter, connected to the output of the GPS receiver and the navigation aids, that integrates the GPS position data and the relative position data and outputs smoothed position data;
    a module for receiving the smoothed position data and utilizing stored map data to output a signal related to a change in the position of the vehicle relative to road lane boundaries, wherein the map is constructed using GPS position points placed into a defined map frame.

2. A real-time integrated navigation system for a vehicle according to claim 1, wherein the Kalman filter configures the smoothed position data to compensate for degradation, blockages or communication dropouts of the GPS data from the satellites.

3. A real-time integrated navigation system for a vehicle according to claim 1, wherein said navigation aids includes at least one of distance measurements, heading measurements, and tilt measurements.

4. A real-time integrated navigation system for a vehicle according to claim 3, wherein said navigation aids includes at least one of anti-lock braking system wheel turns data, electronic compass heading and pitch, and map vertical height.

5. A real-time integrated navigation system for a vehicle according to claim 1, wherein the smoothed position data has a 2-cm position accuracy.

6. A real-time integrated navigation system for a vehicle according to claim 1, wherein said communications link includes a spread spectrum radio modem, and said second antenna is a 900 MHz communications antenna.

7. A method of providing real-time navigation data to a vehicle, comprising the steps of:
    receiving GPS data from satellites via a first antenna connected to a GPS receiver located on the vehicle,
    receiving range and carrier phase measurements from at least one base station via a communications link connected to a second antenna and sending the range and carrier phase measurements to said GPS receiver;
    outputting GPS position data from said GPS receiver to a Kalman filter;
    querying navigation aids to provide relative position data of said vehicle and providing the relative position data to said Kalman filter;
    integrating the GPS position data and the relative position data, using said Kalman filter, and outputting a smoothed position data for the vehicle;
    computing a change in the position of the vehicle relative to road lane boundaries based on the smoothed position data and stored map data, wherein the map is constructed using GPS position points placed into a defined map frame.

8. A method of providing real-time navigation data to a vehicle according to claim 7, wherein said step of integrating the GPS position data and the relative position data compensates for degradation, blockages or communication dropouts of the GPS data from the satellites.

9. A method of providing real-time navigation data to a vehicle according to claim 7, wherein said step of querying navigation aids includes querying a component providing at least one of distance measurements, heading measurements, and tilt measurements.

10. A method of providing real-time navigation data to a vehicle according to claim 7, wherein said step of querying navigation aids includes querying a component providing at least one of anti-lock braking system wheel turns, electronic compass heading and pitch and map vertical height.

11. A method of providing real-time navigation data to a vehicle according to claim 7, wherein the smoothed position data has a 2-cm position accuracy.

* * * * *